(12) United States Patent
Pham et al.

(10) Patent No.: US 8,170,069 B2
(45) Date of Patent: May 1, 2012

(54) METHOD AND SYSTEM FOR PROCESSING SIGNALS FROM A LOCAL COLLECTION FACILITY AT A SIGNAL PROCESSING FACILITY

(75) Inventors: Hoang D. Pham, Westminster, CA (US); Jeanet C. Mika, Manhattan Beach, CA (US); Daniel M. Miner, Redondo Beach, CA (US); Douglas E. Ribordy, Emeryville, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 856 days.

(21) Appl. No.: 11/853,736

(22) Filed: Sep. 11, 2007

(65) Prior Publication Data

US 2009/0070826 A1  Mar. 12, 2009

(51) Int. Cl.
*H04J 3/04* (2006.01)
*H04H 20/71* (2008.01)
(52) U.S. Cl. ........ 370/535; 370/240; 370/532; 455/3.01
(58) Field of Classification Search ............. 370/240.01, 370/532, 535, 240; 155/3.01; 455/3.01
See application file for complete search history.

(56) References Cited

U.S. PATENT DOCUMENTS

| | | |
|---|---|---|
| 4,317,010 A | 2/1982 | Fillot |
| 4,984,252 A | 1/1991 | Morimoto |
| 5,155,483 A | 10/1992 | Morimoto |
| 5,257,106 A | 10/1993 | Maruoka |
| 5,323,322 A | 6/1994 | Mueller et al. |
| 5,351,130 A | 9/1994 | Dugan et al. |
| 5,499,046 A | 3/1996 | Schiller et al. |
| 5,566,353 A | 10/1996 | Cho et al. |

(Continued)

FOREIGN PATENT DOCUMENTS

WO  03/058967 A1  7/2003

OTHER PUBLICATIONS

"Specification for the Use of Video and Audio Coding in DVB Services Delivered Directly Over IP Protocols"; DVB Document Rev. 2; May 2007.

*Primary Examiner* — Hassan Phillips
*Assistant Examiner* — Lonnie Sweet (57) ABSTRACT

A system and method for processing signal in a remote facility includes an IP network and a first local collection facility that includes a first plurality of receiving circuit modules receiving a first plurality of channel signals and generating a first plurality of IP encoded signals from the first plurality of channel signals and a first router routing the first plurality of encoded signals to the IP network. The system also includes a second local collection facility comprising a second plurality of receiving circuit modules receiving a second plurality of channel signals and generating a second plurality of IP encoded signals from the second plurality of channel signals and a second router routing the second plurality of encoded signals to the IP network. The system also includes a remote facility having a statistical multiplexer in communication with the IP network. The remote facility includes a compression system controller configuring the statistical multiplexer and at least one of the first plurality of receiving circuit modules and at least one of the second plurality of receiving circuit modules to form a multicast group so that at least one of the first plurality of encoded signals and at least one of the second plurality of encoded signals are multiplexed together with the statistical multiplexer to form an output signal.

23 Claims, 10 Drawing Sheets

U.S. PATENT DOCUMENTS

| | | |
|---|---|---|
| 5,583,562 A | 12/1996 | Birch et al. |
| 5,600,573 A | 2/1997 | Hendricks et al. |
| 5,646,675 A | 7/1997 | Copriviza et al. |
| 5,659,350 A | 8/1997 | Hendricks et al. |
| 5,666,293 A | 9/1997 | Metz et al. |
| 5,684,714 A | 11/1997 | Yogeshwar et al. |
| 5,933,123 A | 8/1999 | Kaul |
| 5,995,495 A | 11/1999 | Sampson |
| 6,047,162 A * | 4/2000 | Lazaris-Brunner et al. .. 455/12.1 |
| 6,154,772 A | 11/2000 | Dunn et al. |
| 6,266,329 B1 | 7/2001 | Lazaris-Brunner et al. |
| 6,308,286 B1 | 10/2001 | Richmond et al. |
| 6,401,242 B1 | 6/2002 | Eyer et al. |
| 6,434,562 B1 | 8/2002 | Pennywitt et al. |
| 6,529,146 B1 | 3/2003 | Kowalski et al. |
| 6,557,031 B1 | 4/2003 | Mimura et al. |
| 6,625,811 B1 | 9/2003 | Kaneko |
| 6,654,923 B1 | 11/2003 | Grenier et al. |
| 6,741,553 B1 | 5/2004 | Grenier |
| 6,795,506 B1 * | 9/2004 | Zhang et al. .............. 375/240.26 |
| 6,873,877 B1 | 3/2005 | Tobias et al. |
| 6,910,078 B1 | 6/2005 | Raman et al. |
| 7,039,937 B1 | 5/2006 | Glenn |
| 7,068,975 B2 | 6/2006 | Loner |
| 7,072,365 B1 | 7/2006 | Ansley |
| 7,212,738 B1 | 5/2007 | Wang |
| 7,219,367 B2 | 5/2007 | Briggs |
| 7,224,837 B2 | 5/2007 | Olshansky et al. |
| 7,302,224 B2 | 11/2007 | Sibley et al. |
| 7,315,887 B1 | 1/2008 | Liang et al. |
| 7,346,918 B2 | 3/2008 | Hennenhoefer et al. |
| 7,380,264 B2 | 5/2008 | Potrebic |
| 7,460,832 B2 | 12/2008 | Lee et al. |
| 7,493,648 B2 | 2/2009 | Hisamatsu et al. |
| 7,525,993 B2 | 4/2009 | Yousef |
| 7,529,276 B1 * | 5/2009 | Ramakrishnan .............. 370/516 |
| 7,596,350 B1 | 9/2009 | Ladrach |
| 7,602,846 B1 | 10/2009 | Wu et al. |
| 7,607,154 B2 | 10/2009 | Morello |
| 7,650,620 B2 | 1/2010 | Fish et al. |
| 2001/0003846 A1 | 6/2001 | Rowe et al. |
| 2001/0026537 A1 | 10/2001 | Massey |
| 2001/0036198 A1 | 11/2001 | Arsenault et al. |
| 2002/0007494 A1 | 1/2002 | Hodge |
| 2002/0053049 A1 | 5/2002 | Shiomoto et al. |
| 2002/0105976 A1 | 8/2002 | Kelly et al. |
| 2002/0150061 A1 | 10/2002 | Arsenault |
| 2002/0186320 A1 | 12/2002 | Carlsgaard et al. |
| 2002/0194596 A1 | 12/2002 | Srivastava |
| 2003/0007564 A1 | 1/2003 | Jeong |
| 2003/0018975 A1 | 1/2003 | Stone |
| 2003/0022625 A1 | 1/2003 | Otten et al. |
| 2003/0028897 A1 | 2/2003 | Brooks |
| 2003/0088873 A1 | 5/2003 | McCoy et al. |
| 2003/0140353 A1 | 7/2003 | Hugenberg et al. |
| 2003/0161262 A1 | 8/2003 | Hosoi |
| 2003/0196211 A1 | 10/2003 | Chan |
| 2003/0217362 A1 | 11/2003 | Summers et al. |
| 2004/0022275 A1 | 2/2004 | Blanchard |
| 2004/0022535 A1 | 2/2004 | Wang et al. |
| 2004/0078807 A1 | 4/2004 | Fries et al. |
| 2004/0120349 A1 | 6/2004 | Border et al. |
| 2004/0181813 A1 | 9/2004 | Ota et al. |
| 2004/0216171 A1 | 10/2004 | Barone et al. |
| 2004/0234145 A1 | 11/2004 | Yatabe et al. |
| 2004/0255333 A1 | 12/2004 | Kenworthy |
| 2005/0002339 A1 | 1/2005 | Patil et al. |
| 2005/0076134 A1 | 4/2005 | Bialik et al. |
| 2005/0086696 A1 | 4/2005 | Daniels |
| 2005/0099969 A1 | 5/2005 | Roberts et al. |
| 2005/0155079 A1 | 7/2005 | Chen et al. |
| 2005/0160477 A1 | 7/2005 | Saito |
| 2005/0175085 A1 * | 8/2005 | Bergen et al. ............ 375/240.01 |
| 2005/0210123 A1 | 9/2005 | Wang et al. |
| 2005/0210133 A1 | 9/2005 | Florissi et al. |
| 2005/0240967 A1 * | 10/2005 | Anderson et al. ............... 725/52 |
| 2006/0018254 A1 | 1/2006 | Sanders et al. |
| 2006/0035610 A1 | 2/2006 | Potrebic |
| 2006/0050184 A1 | 3/2006 | McMiller et al. |
| 2006/0064726 A1 | 3/2006 | Loner |
| 2006/0085834 A1 | 4/2006 | Chang et al. |
| 2006/0098735 A1 | 5/2006 | Chang |
| 2006/0126634 A1 | 6/2006 | Park |
| 2006/0166699 A1 | 7/2006 | Aghvami et al. |
| 2006/0198389 A1 | 9/2006 | Eriokson et al. |
| 2007/0002851 A1 | 1/2007 | Paila et al. |
| 2007/0022438 A1 | 1/2007 | Arsenau et al. |
| 2007/0040933 A1 * | 2/2007 | Seong ........................ 348/385.1 |
| 2007/0053379 A1 | 3/2007 | Hershey et al. |
| 2007/0079351 A1 | 4/2007 | Wang et al. |
| 2007/0091857 A1 * | 4/2007 | Elstermann ................... 370/338 |
| 2007/0094691 A1 | 4/2007 | Gazdzinski |
| 2007/0118861 A1 | 5/2007 | Stone |
| 2007/0136765 A1 | 6/2007 | Shah et al. |
| 2007/0136777 A1 | 6/2007 | Hasek et al. |
| 2007/0162927 A1 | 7/2007 | Ramaswamy et al. |
| 2007/0186251 A1 | 8/2007 | Horowitz et al. |
| 2007/0204300 A1 | 8/2007 | Markley et al. |
| 2007/0204311 A1 | 8/2007 | Hasek et al. |
| 2007/0261073 A1 | 11/2007 | Blumenschein et al. |
| 2007/0263627 A1 * | 11/2007 | Karino et al. ................. 370/390 |
| 2007/0268817 A1 | 11/2007 | Smallegange et al. |
| 2008/0069155 A1 | 3/2008 | Honhart |
| 2008/0101455 A1 | 5/2008 | Scheelke |
| 2008/0102750 A1 | 5/2008 | Keener et al. |
| 2008/0137543 A1 | 6/2008 | Mitra |
| 2008/0201748 A1 | 8/2008 | Hasek et al. |
| 2008/0282011 A1 | 11/2008 | Tsai et al. |
| 2008/0291907 A1 | 11/2008 | Rogasch |
| 2009/0022241 A1 | 1/2009 | Fukuoka et al. |
| 2009/0025027 A1 | 1/2009 | Craner |
| 2009/0052323 A1 | 2/2009 | Breynaert et al. |
| 2009/0066848 A1 | 3/2009 | St. Laurent et al. |
| 2009/0067365 A1 | 3/2009 | Pham et al. |
| 2009/0067432 A1 | 3/2009 | St. Laurent et al. |
| 2009/0067433 A1 | 3/2009 | St. Laurent et al. |
| 2009/0067490 A1 | 3/2009 | Barroso |
| 2009/0069021 A1 | 3/2009 | Barroso |
| 2009/0070824 A1 | 3/2009 | Barroso |
| 2009/0070825 A1 | 3/2009 | Pham et al. |
| 2009/0070830 A1 | 3/2009 | Pham et al. |
| 2009/0070846 A1 | 3/2009 | St. Laurent et al. |
| 2009/0109836 A1 | 4/2009 | Wasden et al. |
| 2009/0109883 A1 | 4/2009 | Wasden et al. |
| 2009/0110052 A1 | 4/2009 | Wasden et al. |
| 2009/0113490 A1 | 4/2009 | Wasden et al. |
| 2009/0213814 A1 | 8/2009 | Heo et al. |
| 2009/0254962 A1 | 10/2009 | Hendricks et al. |
| 2010/0208595 A1 | 8/2010 | Zhao et al. |

* cited by examiner

METHOD AND SYSTEM FOR PROCESSING SIGNALS FROM A LOCAL COLLECTION FACILITY AT A SIGNAL PROCESSING FACILITY

TECHNICAL FIELD

The present disclosure relates generally to communication systems, and more particularly to a method and system for processing signals at a remote facility received from a local collection facility.

BACKGROUND

The statements in this section merely provide background information related to the present disclosure and may not constitute prior art.

Satellite broadcasting of television signals has increased in popularity. Satellite television providers continually offer more and unique services to their subscribers to enhance the viewing experience. Providing reliability in a satellite broadcasting system is therefore an important goal of satellite broadcast providers. Providing reliable signals reduces the overall cost of the system by reducing the number of received calls at a customer call center.

In satellite broadcasting systems, users have come to expect the inclusion of local channels in addition to the channels broadcast for the entire Continental United States. Collecting the channels may be performed in various manners, including providing a manned station that receives the signals. The signals may be uplinked from various locations. Providing manned stations increases the labor costs and thus increases the overall cost of the service.

SUMMARY

The present disclosure provides a means for monitoring and processing signals in an uplink processing system.

In one aspect of the invention, a method includes at a first local collection facility comprising a first plurality of receiving circuit modules: receiving a first plurality of channel signals at the first plurality of receiving circuit modules; generating a first plurality of IP encoded signals from the first plurality of channel signals and, at a first router, routing the first plurality of encoded signals to an IP network. The method also includes at a second local collection facility comprising a second plurality of receiving circuit modules: receiving a second plurality of channel signals at the second plurality of receiving modules; generating a second plurality of IP encoded signals from the second plurality of channel signals and, at a second router, routing the second plurality of encoded signals to the IP network. At a remote facility, the method includes configuring a statistical multiplexer with a compression system controller, at least one of the first plurality of receiving circuit modules and at least one of the second plurality of receiving circuit modules to form a multicast group so that at least one of the first plurality of encoded signals and at least one of the second plurality of encoded signals are multiplexed together with the statistical multiplexer to form an output signal.

In yet another aspect of the invention, a system includes an IP network and a first local collection facility that includes a first plurality of receiving circuit modules receiving a first plurality of channel signals and generating a first plurality of IP encoded signals from the first plurality of channel signals and a first router routing the first plurality of encoded signals to the IP network. The system also includes a second local collection facility comprising a second plurality of receiving circuit modules receiving a second plurality of channel signals and generating a second plurality of IP encoded signals from the second plurality of channel signals and a second router routing the second plurality of encoded signals to the IP network. The system also includes a remote facility having a statistical multiplexer in communication with the IP network. The remote facility includes a compression system controller configuring the statistical multiplexer and at least one of the first plurality of receiving circuit modules and at least one of the second plurality of receiving circuit modules to form a multicast group so that at least one of the first plurality of encoded signals and at least one of the second plurality of encoded signals are multiplexed together with the statistical multiplexer to form an output signal.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The present disclosure is described with respect to a satellite television system. However, the present disclosure may have various uses including satellite data transmission and reception for home or business uses. The system may also be used in a cable system or wireless terrestrial communication system.

Figure 1:
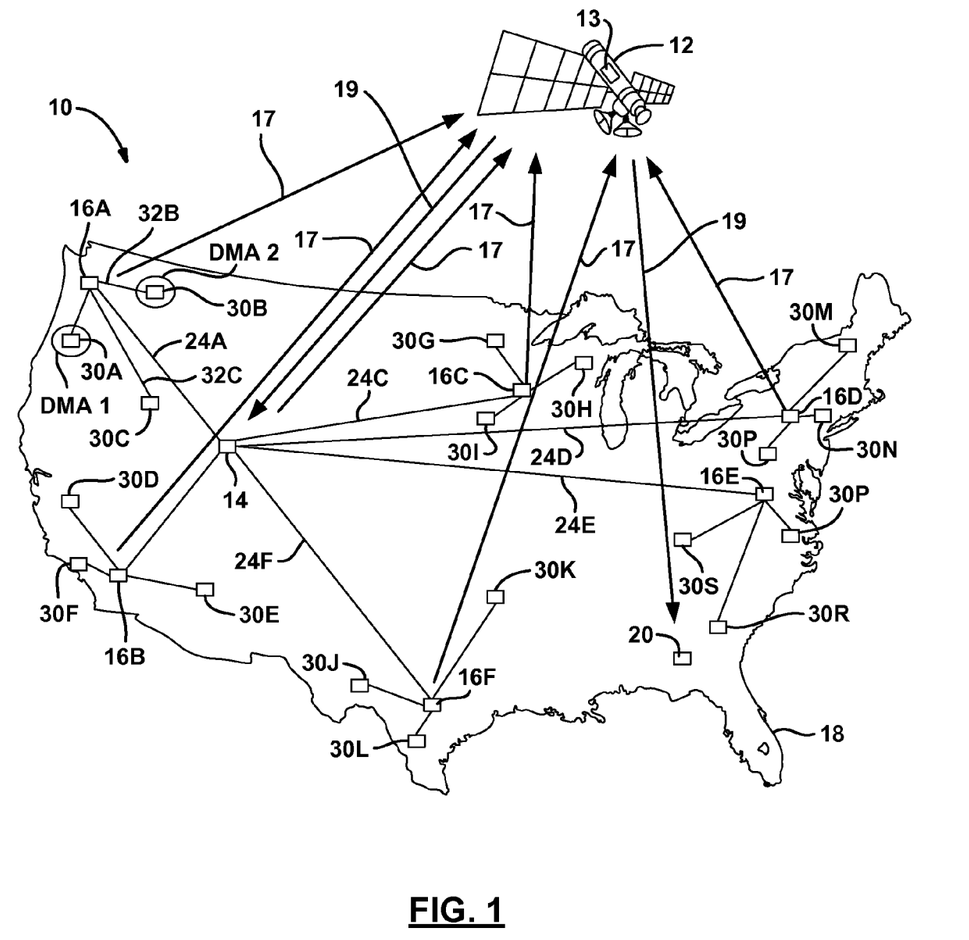
FIG. 1 is an overall system view of a collection and communication system in the continental United States.

Referring now to FIG. 1, a collection and communication system 10 includes a satellite 12 that includes at least one transponder 13. Typically, multiple transponders are in a satellite. Although only one satellite is shown, more than one is possible or even likely.

The collection and communication system 10 includes a central facility or Network operations center (NOC) 14 and a plurality of regional or remote uplink facilities (RUF) 16A, 16B, 16C, 16D, 16E and 16F. In a non-satellite system the facilities may be referred to as a remote facility. The regional or remote uplink facilities 16A-16F may be located at various locations throughout a landmass 18 such as the continental United States, including more or less than those illustrated. The regional or remote uplink facilities 16A-16F uplink various uplink signals 17 to satellite 12. The satellites downlink signals 19 to various users 20 that may be located in different areas of the landmass 18. The users 20 may be mobile or fixed users. The uplink signals 17 may be digital signals such as digital television signals or digital data signals. The digital television signals may be high definition television signals, standard definition signals or combinations of both. Uplinking may be performed at various frequencies including Ka band. The present disclosure, however, is not limited to Ka band. However, Ka band is a suitable frequency example used throughout this disclosure. The central facility or NOC 14 may also receive downlink signals 19 corresponding to the uplink signals 17 from the various regional or remote uplink facilities and from itself for monitoring purposes. The central facility 14 may monitor and control the quality of all the signals broadcast from the system 10.

The central facility 14 may also be coupled to the regional or remote uplink facilities through a network such as a computer network having associated communication lines 24A-24F. Each communication line 24A-F is associated with a respective regional or remote uplink site 16. Communication lines 24A-24F are terrestrial-based lines. As will be further described below, all of the functions performed at the regional or remote uplink facilities may be controlled centrally at the central facility 14 as long as the associated communication line 24A-F is not interrupted. When a communication line 24A-F is interrupted, each regional or remote uplink site 16A-F may operate autonomously so that uplink signals may continually be provided to the satellite 12. Each of the regional or remote uplink and central facilities includes a transmitting and receiving antenna which is not shown for simplicity in FIG. 1.

Each of the regional or remote uplink facilities 16A-16F may also be in communication with a local collection facility collectively referred to with reference numeral 30. As illustrated in FIG. 1, three local collection facilities are associated with each remote uplink facility 16. For example, remote uplink facility 16A has local collection facilities 30A, 30B and 30C associated therewith. Local collection facilities 30D-30S are associated with one of the other remote uplink facilities 16B-16F. Although only three local collection facilities are illustrated for each remote uplink facility 16, numerous local collection facilities may be associated with each remote uplink facility 16. The number of local collection facilities 30 may be numerous, such as 40 for each remote uplink facility. The number of local collection facilities 30 is limited by the amount of equipment and the capabilities thereof associated with each remote uplink facility 16.

The local collection facilities 30 are used for collecting local television stations in various designated marketing areas (DMA). As is illustrated, local collection facility 30A is located in DMA1 and local collection facility 30B is located in DMA2. For simplicity, only two DMAs are illustrated. However, each local collection facility may be located in a DMA.

The local collection facilities 30 may be in communication with each remote uplink facility 16 through a communication network 32. As will be described below, the communication network 32 may be an internet protocol (IP) network. The signals from the local collection facilities 30 may thus be video-over-IP signals. Each of the remote uplink facilities 16 are in communication with each local collection facility 30 through the communication network 32. As is illustrated, local collection facility 30A is in communication with the remote uplink facility 16A through communication network 32A, while local collection facility 30B is in communication with the remote uplink facility 16A through communication network 32B, and so on.

Figure 2:
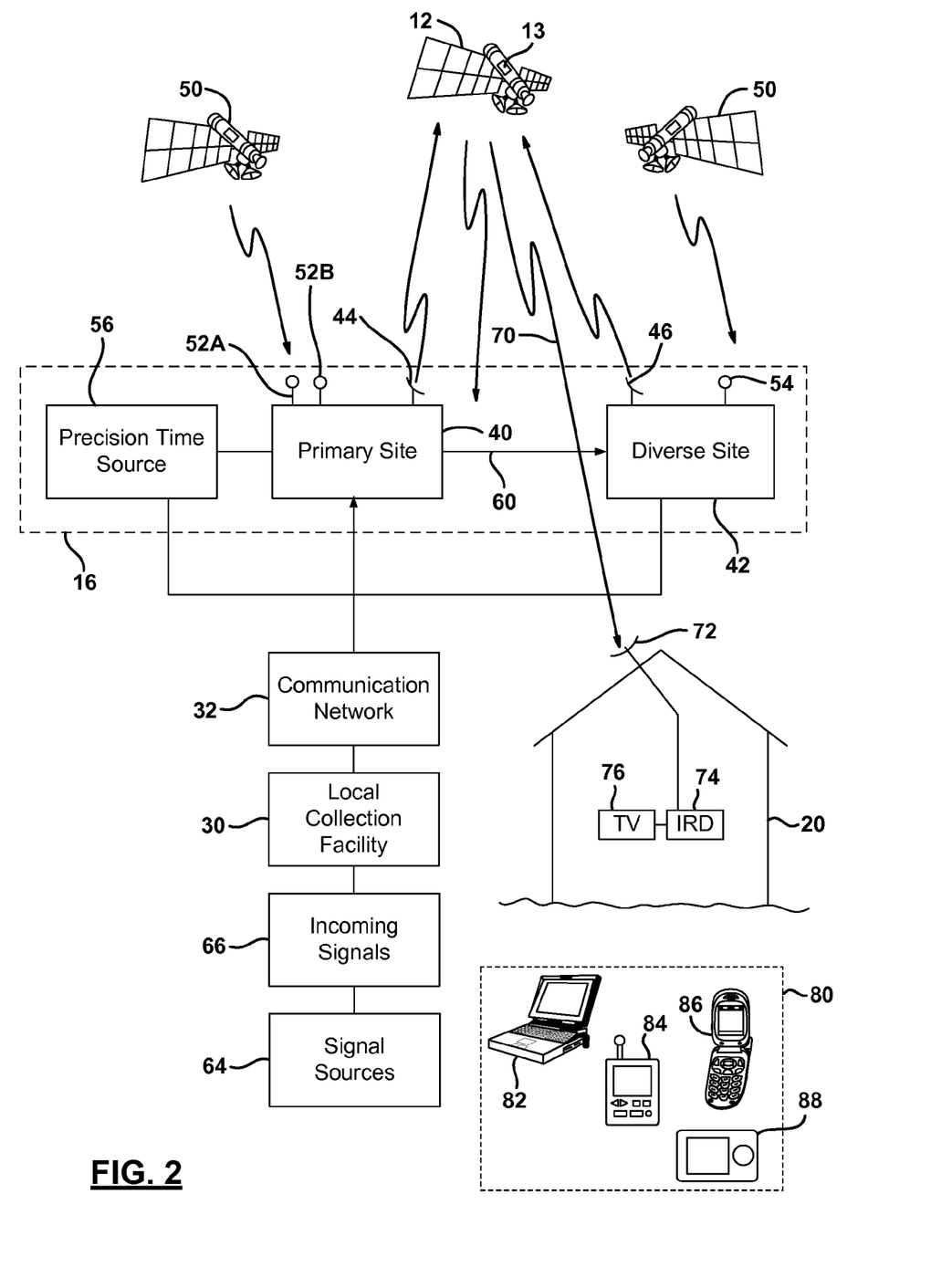
FIG. 2 is a system view at the regional level of the collection and communication system.

Referring now to FIG. 2, the regional or remote uplink facilities 16A-16F of FIG. 1 are illustrated collectively as reference numeral 16. The regional facilities 16 may actually comprise two facilities that include a primary site 40 (such as the remote uplink facility 16 above) and a diverse site 42. The primary site 40 may be referred to as a primary broadcast center (PBC). As will be described below, the central site 14 may also include a primary site and diverse site as is set forth herein. The primary site 40 and diverse site 42 of both the central and regional sites may be separated by at least 25 miles, or, more even more such as, at least 40 miles. In one constructed embodiment, 50 miles was used. The primary site 40 includes a first antenna 44 for transmitting and receiving signals to and from satellite 12. Diverse site 42 also includes an antenna 46 for transmitting and receiving signals from satellite 12.

Primary site 40 and diverse site 42 may also receive signals from GPS satellites 50. GPS satellites 50 generate signals corresponding to the location and a precision timed signal that may be provided to the primary site 40 through an antenna 52 and to the diverse site 42 through an antenna 54. It should be noted that redundant GPS antennas (52A,B) for each site may be provided. In some configurations, antennas 44 and 46 may also be used to receive GPS signals.

A precision time source 56 may also be coupled to the primary site 40 and to the diverse site 42 for providing a precision time source. The precision time source 56 may include various sources such as coupling to a central atomic clock. The precision time source 56 may be used to trigger certain events such as advertising insertions and the like.

The primary site 40 and the diverse site 42 may be coupled through a communication line 60. Communication line 60 may be a dedicated communication line. The primary site 40 and the diverse site 42 may communicate over the communication line using a video over internet protocol (IP).

Various signal sources 64 such as an optical fiber line, copper line or antennas may provide incoming signals 66 to the local collection facility 30. Incoming signal 66, as mentioned above, may be television signals. The television signals may be over-the-air high-definition signals, over-the-air standard television signals, or high or standard definition signals received through a terrestrial communication line. The incoming signals 66 such as the television signals may be routed from the local collection facility 30 through the communication network 30 to the primary site 40, or the diverse site 42 in the event of a switchover. The switchover may be manual or a weather-related automatic switchover. A manual switchover, for example, may be used during a maintenance condition.

Users 20 receive downlink signals 70 corresponding to the television signals. Users 20 may include home-based systems, business-based systems or multiple dwelling unit systems. As illustrated, a user 20 has a receiving antenna 72 coupled to an integrated receiver decoder (IRD) 74 that processes the signals and generates audio and video signals corresponding to the received downlink signal 70 for display on the television or monitor 76. It should also be noted that satellite radio receiving systems may also be used in place of the IRD 74. The integrated receiver decoder 74 may be incorporated into or may be referred to as a set top box.

The user 20 may also be a mobile user. The user 20 may therefore be implemented in a mobile device or portable device 80. The portable device 80 may include but are not limited to various types of devices such as a laptop computer 82, a personal digital assistant 84, a cellular telephone 86 or a portable media player 88.

Figure 3:
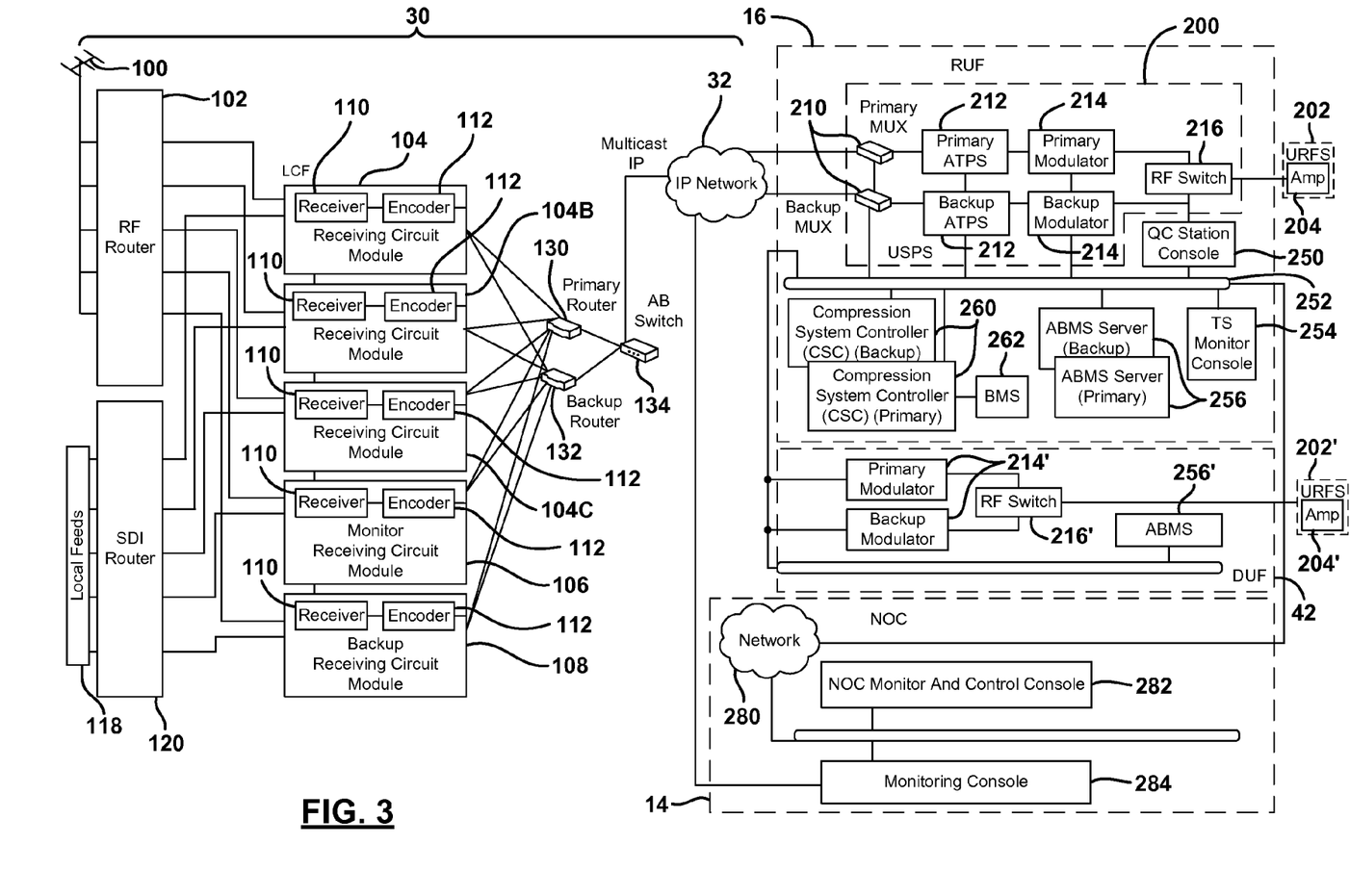
FIG. 3 is a detailed block diagrammatic view of a first embodiment of the collection and communication system illustrated in FIGS. 1 and 2.

Referring now to FIG. 3, the local collection facility 30 is illustrated in more detail adjacent to the remote uplink facility (RUF) 16. As mentioned above, the local collection facility 30 is in communication with the remote uplink facility 16 through a network 32 such as an IP network. The local collection facility 30 is used for collecting signals in a designated marketing area or other area. The channel signals may be received as over-the-air television signals or through a direct local feed such as an optical fiber or wire. For an over-the-air signal, an antenna or plurality of antennas 100 are provided. The antenna channel signals are directed to a router 102. The router signals are communicated to a plurality of receiver circuit modules 104A-C (collectively referred to as 104). The number of receiver circuit modules 104 depends upon various design parameters such as how many channels the designated market includes. Various numbers of receiver circuit modules 104 may be provided.

In addition to the receiver circuit modules 104, a monitor receiver circuit module 106 may also be coupled to the RF router 102. Also, a back-up receiver circuit module 108 may be included at the local collection facility 108.

The details of the receiver circuit modules 104A-C, 106 and 108 will be further described below. However, the receiver circuit modules generally include a receiver module 110 and an encoder module 112. The receiver module 110 is used to tune, demodulate and decode the over-the-air signals. The decoder may decode from MPEG2 format. The receiver circuit module, as will be described below, includes an ATSC receiver or an NTSC receiver. The receive signals are processed and encoded into a format such an IP format in the encoder 112. The monitor receiver circuit module is used for generating monitor circuits for each of the receive channel signals. That is, although only one receiver module may be provided, the monitoring system may monitor one of the channel signals. This may be performed remotely through the network 32 from the remote uplink facility 16. The encoder 112 may encode into MPEG4 format.

A serial digital interface router 120 may also be provided. The serial digital interface router may be a high definition serial digital interface router. The serial digital interface (SDI) router 120 may receive local feeds directly from the local channel providers. These may be provided through a wire or optical fiber. The SDI router 120 routes the channel signals received from the local feeds 118 to the receiving circuit modules 104A-C, 106 and 108. The output of the receiving circuit modules 104A-C, 106 and 108 are in communication with a primary router 130 and a back-up router 132. A suitable example of a primary and back-up router is a Cisco® 7604. Preferably each of the receiving circuit modules 104, 106 and 108 are in communication with both the primary router 130 and the back-up router 132. An A-B switch 134 is used to generate an output signal corresponding to one of the primary router 130 or the back-up router 132. The routers 130, 132 route the IP signals through the switch 134 and through the network 32 which communicates the encoded channel signals to the remote uplink facility 16, diverse uplink facility and the network operation center. The routers 130, 132 and the switch 134 may be monitored and controlled by the compression system controlled or ABMS system described below.

The remote uplink facility 16 may include an uplink signal processing system (USPS) 200. In a constructed embodiment several uplink signal processing systems 200 may be provided. This may include a secondary or back-up USPS that will be referred to as an engineering USPS 200' described in FIG. 4 below. The encoded channel signals routed through the network 32 includes identification of the signal so that it may be properly routed to the proper uplink signal processing system. As described below, this may be done by multicasting. The uplink signal processing system 200 generates an output signal to an uplink RF system (URFS) 202 that includes a power amplifier 204. The output signal of each USPS 200 may correspond to one transponder of a satellite. The output signal is a multiplexed signal that may include both high definition television signals and standard definition television signals. The uplink signal processing system 200 may also provide redundant pairs to increase the reliability of the output signal.

The uplink signal processing system 200 may include a multiplexer 210, an advance transport processing system (ATPS) 212, and a modulator 214. Pairs of multiplexers 210, advance transport processing systems 212, and modulators 214 may be provided for redundancy. That is primary and back-up pairs of each may be provided.

The multiplexer 210 multiplexes the decoded channel signals from the local area network 32 into a multiplexed transport stream (MPTS). The multiplexer 210 may also act to insert advertising into the signal. Thus, the multiplexer 210 may act as a multiplexing module and as an ad insertion module. The multiplexer 210 may be a statistical multiplexer used to group signals from various local collection facilities. Various numbers of encoded channel signals may be multiplexed. In one constructed embodiment, eight channel signals were multiplexed at each multiplexer 210.

The advance transport processing system (ATPS) 212 converts the transport stream from the multiplexer 210 into an advanced transport stream such as the DIRECTV® A3 transport stream. The ATPS 212 may support either ASI or MPEG output interface for the broadcast path. Thus, the ATPS 212 acts as an encryption module.

The modulators 214 modulate the transport stream from the ATPS 212 and generate an RF signal at a frequency such as an L-band frequency. An RF switch 216 is coupled to the primary modulator and back-up modulator 214. The RF switch provides one output signal to the uplink RF system 202. The USPS 200 may also be coupled to a quality control (QC) station console 250. The quality control station console 250 may be coupled directly to the RF switch 216. The quality control station console 250 may also be coupled to a communication monitoring bus 252. The bus 252 may be used to communicate between various components used for monitoring and controlling the various components in the remote uplink facility and the local collection facilities. The bus 252 may, for example, be in communication with a tech services monitor console 254. The bus 252 may also be coupled to an advance broadcast management system (ABMS) server 256. As is illustrated in FIG. 3, both a primary server and a back-up server 256 are illustrated.

A compression system controller 260 may also be coupled to the bus 252. As is illustrated, both a primary and back-up compression system controller 260 may be provided. The compression system controller 260 may be coupled to a broadcast management system 262 as will be further described below. The ABMS system 256 and the compression system controller 260 may be used to control various functions and monitor various functions of the remote uplink facility and the local collection facilities. These functions will be further described below.

The compression system controller 260 is a centralized server which is used to control and monitor the receiving circuit modules within the chain of a remote uplink facility. The compression system controller 260 may be used to manage, configure, control and monitor the receiving circuit modules and the encoders therein. The compression system controller may also control the routers, switches and receivers within the receiving circuit modules. The compression system controller may be physically located within the remote uplink facility. However, web access may be provided through a standard web browser for allowing users to interface, configure and control the various systems. In addition to controlling the receiving circuit modules and the statistical multiplexers, the compression system controller 260 may be used to initiate a redundancy switch to a back-up receiving circuit module or encoder within the local collection facilities. The compression system controller may also be used to initiate a switch to a back-up statistical multiplexer within the remote uplink facility 16. The compression system controller may also be used to update the remote broadcast management system 262.

Each of the components of the USPS 200 may be coupled to the bus 252. That is, the primary and back-up multiplexers 210, the primary and back-up ATPS's 212, the primary and back-up modulators 214 and the RF switch 216 may all be coupled to the bus 252.

The ABMS system 256 may be used for various monitoring such as transport level errors, video outages, audio outages, loss of connection from a redundancy controller or a data source or a compression system controller 260.

The remote uplink facility may also include the diverse uplink facility or diverse site 42. The diverse site may receive signals from the primary ATPS 212 in the event of a modulator 214 or switch failure 216. The transport stream signals provided from the primary or back-up advanced transport processing system 212 are communicated to the primary modulator or back-up modulator 214' of the diverse facility 42. An RF switch 216' may be used to couple the output of either the primary modulator or the back-up modulator 214' to the uplink RF system 202. The ABMS system 256' may also be used to monitor the output of the diverse uplink facility 256'.

The network operation center 14 may be coupled the IP network 32. The network operation center may also be coupled to the remote uplink facility through an ATM or IP network 280. The network operation center may have a monitor and control console 282 and a monitoring decoder 284 for monitoring and controlling various functions of the various remote uplink facilities. The network operation center monitor and control console 282 may also be used to control and monitor the various local collection facilities 30. This may be performed directly or through the compression system controller 260.

Figure 4:
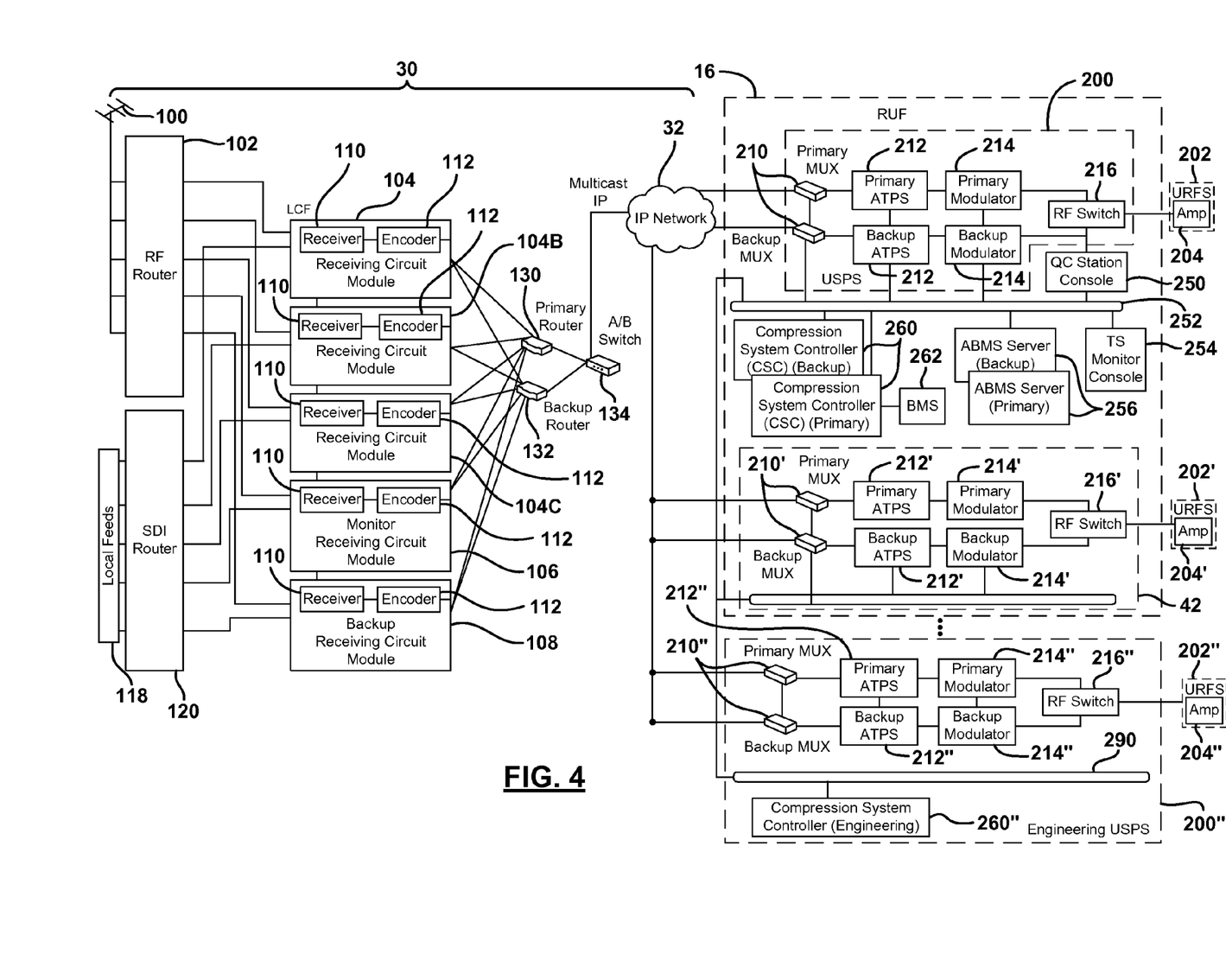
FIG. 4 is a detailed block diagrammatic view of a second embodiment of the collection and communication system illustrated in FIGS. 1 and 2.

Referring now to FIG. 4, a system similar to that of FIG. 3 is illustrated. The common components will thus not be described further. The system of FIG. 4 illustrates that multiple USPS circuits may be included in the remote facility. The multiple USPS circuits are illustrated with the same reference numerals as the USPS chain with primed numbers. The functions are the same as the unprinted components. The USPS's 200-200" may be referred to as a production USPS.

The system of FIG. 4 also illustrates an engineering uplink signal processing system 200". The engineering uplink signal processing system 200" may be coupled to the network 32 and/or the bus 252. The engineering uplink signal processing system 200" may be at a same location as one of the remote uplink facilities or a different location than the remote uplink facilities. The engineering uplink signal processing system 200" may be used when one of the remote uplink facilities is under maintenance or if an error occurs. Switching to the engineering uplink signal processing system 200" will be described below. The engineering uplink signal processing system 200" includes a primary and back-up MUX 210", a primary and back-up ATPS 212", a primary and back-up modulator 214" and an RF switch 216". The functioning of each of the components of the USPS is similar to those described above with respect to the production USPS 200 and thus will not be described. The output of the RF switch 216" is communicated to an uplink RF system 202" that includes an amplifier 204" for uplinking signals to a satellite. A compression system controller 260" may be in communication with the engineering USPS 200" through a bus 290.

Figure 5:
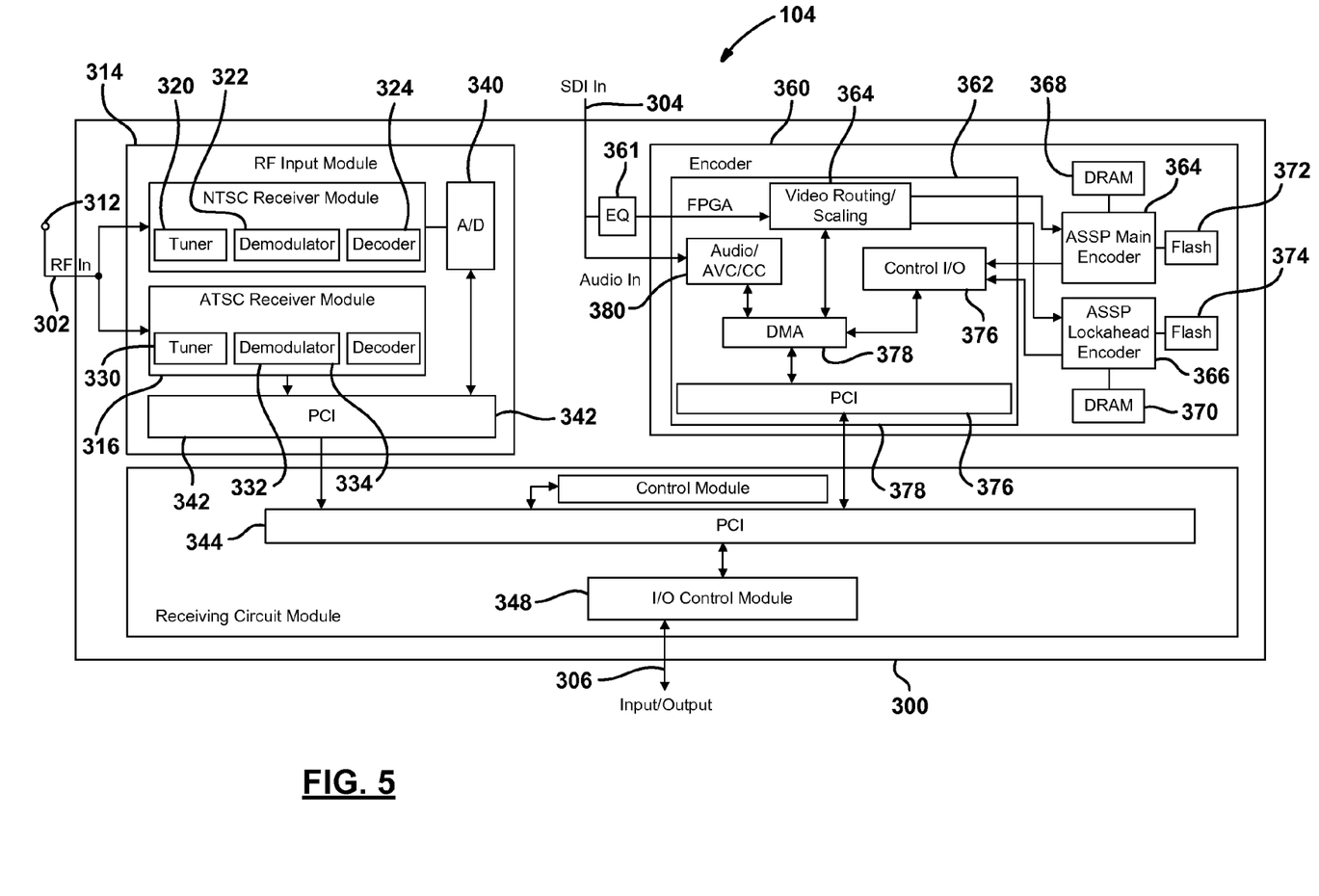
FIG. 5 is a block diagrammatic view of a receiving circuit module illustrated in FIGS. 3 and 4.

Referring now to FIG. 5, the receiving circuit module 104 is illustrated in further detail. The receiving circuit module 104 includes a housing 300 that has an RF input 302 coupled to an antenna 312 or the like and an SDI input 304 coupled to a wire or optical fiber. The housing also includes an input/output interface 306 for coupling signals to an IP network.

The RF input 302 is in communication with an antenna 312 and an NTSC receiver module 314 and an ATSC receiver module 316. The NTSC receiver module 314 may include a tuner 320, a demodulator 322 and a decoder 324. The ATSC receiver module 316 may also include a tuner 330, a demodulator 332 and a decoder 334. Both receiver modules 314, 316 may tune to a particular channel and demodulate and decode the particularly formatted channel signal. Because the NTSC receiver module 314 is receiving an analog signal, the analog signal is converted to a digital signal and an analog-to-digital converter 340. The output of the analog-to-digital converter 340 and the ATSC receiver module 316 is communicated to a bus such as a peripheral component interconnect (PCI) 342. The PCI 342 may be coupled to a PCI 344 that is in communication with a control module 346 such as a mother board and an input/output (I/O) control module 348. The I/O control module 348 may control the communication into and out of the input/output interface 306. The control modules 346, 348 may also route input signals to the RF input module 300.

The I/O control module 348 may control incoming control signals from the network 32 which originate from the RUF. The control signals may be used to control and configure the encoder and receivers. The I/O control module 348 may also be used to generate an output signal with data for the compression system controller at the RUF to monitor. The data may include an indication as to the health and status of the various components.

An encoder 360 may also be included within the same housing 300. The encoder 360 may receive signals directly from the SDI input 304 or through an equalizer 361. Audio signals may also be received through the SDI input 304. The encoder 360 may comprise a field programmable gate array (FPGA) 362 that includes a video routing and scaling module 364 that provides signals to an ASSP main encoder 364 and an ASSP lookahead encoder 366. The encoders 364, 366 may include a DRAM 368 and 370, respectively. A flash memory 372 and flash memory 374 may also be associated with the respective encoders 364, 366. An input and output controller 376 may receive information or data from the encoders 364, 366 and provide the information or data to a direct memory access module 378. The DMA module 378 may also receive signals from an audio/advanced video coding/closed-captioning module 380. The function of the encoder 362 is to encode the signals into format responsive to transmission though the network 32. In this example, the format is an IP format. The signals from either the NTSC receiver module 314 or the ATSC receiver module 316 may also be encoded. Each receiving circuit module 104 and thus each RF input module 314 and encoder 360 are used to process a single-receive channel. Encoding may be into MPEG4 format.

One advantage of the configuration of receiving circuit module 104 is that multiple sources can be used to receive a channel signal. Conventional standard definition over-the-air signals may be received with the NTSC receiver module 314. The ATSC receiver module 316 may be used to receive high definition over-the-air broadcast signals. The SDI input 304 may be used to receive standard definition signals received through a cable or optical fiber. Through the control module 348 which may be controlled from the remote uplink facility, the type of input may be selected. It should be noted that the switching from the various types of receiving sources may be performed remotely from the remote uplink facility or the network operation center. Thus, without local personnel the remote uplink facility can be configured for different channel types. This will be particularly useful when over-the-air standard definition signals are no longer broadcast.

Another advantage of the receiving circuit module 104 is that by combining the encoding and receiving functions together in one housing, the amount of rack space consumed is reduced.

Figure 6:
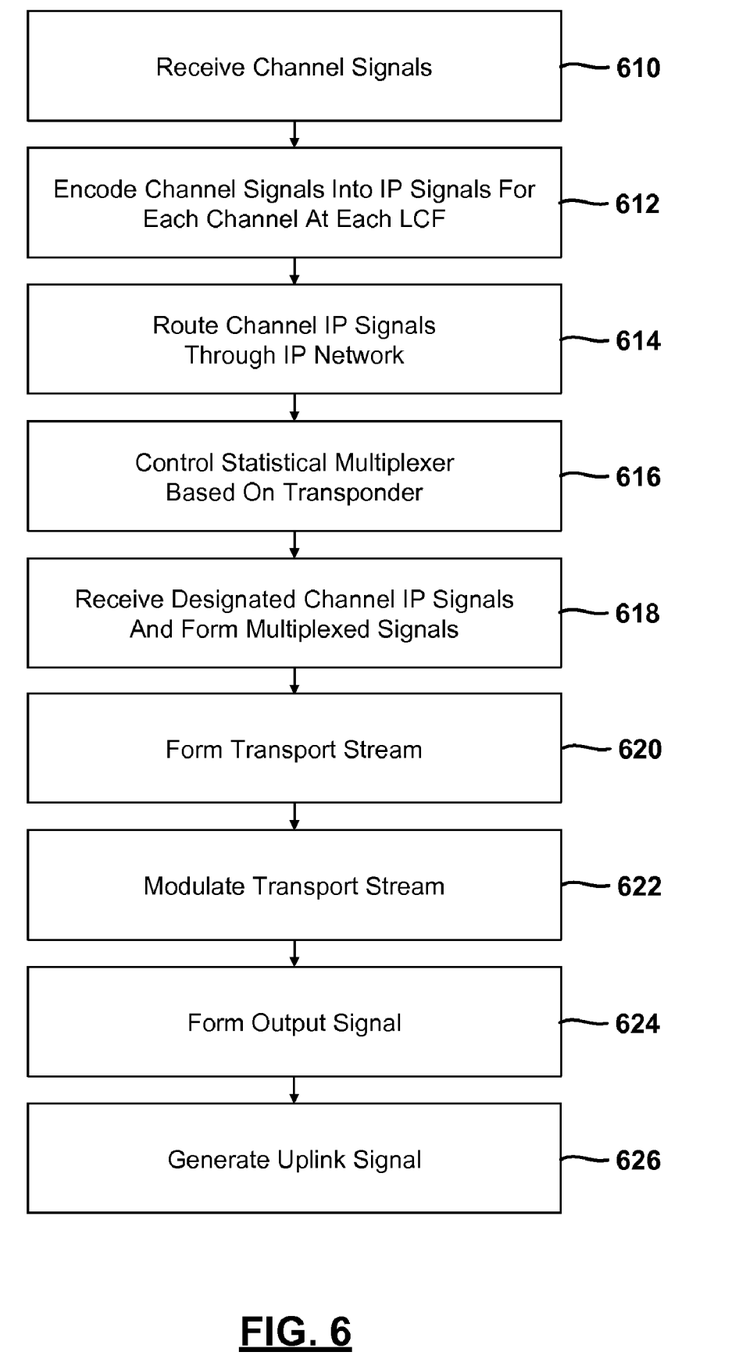
FIG. 6 is a flowchart illustrating a method for operating the system.

Referring now to FIG. 6, a method of operating the system illustrated in FIGS. 3 and 4 is illustrated. In step 610, the channel signals are received at the local collection facility through either an antenna or an over-the-air transmission. As mentioned above, the received channel signals may be standard definition (NTSC) or high definition signals (ATSC).

In step 612, the received channel signals are encoded into a format suitable for transmission to the remote uplink facility. In this example, IP signals are used. This may be MPEG4 format. That is, the received channel signals are converted into IP signals for each channel at the local collection facility. This may be performed using a separate receiving circuit module illustrated in FIGS. 3, 4 and 5 corresponding to each of the channel signals.

In step 614, the channel IP signals that have been encoded are routed through the routers to the remote uplink facility.

In step 616, a statistical multiplexer in one of the USPS circuits at the remote uplink facility is controlled and receives the various signals. The statistical multiplexer is used to receive various signals to form an uplink signal for a transponder. The statistical multiplexer may receive signals from a number of different local collection facilities and assemble them into a multiplexed signal. The statistical multiplexers may change the channel allocation based upon the various parameters for the various signals. The compression system controller 260 illustrated in FIGS. 3 and 4 may be used to control the allocation. Multicast addresses may be assigned to the channel IP signals so that the multiplexers receive the grouping of the signals.

In step 618, the statistical multiplexers receive the designated channel IP signals and form multiplexed signals. In step 620, a transport stream is formed in the ATPS. The ATPS may encode the signal.

In step 622, the modulator modulates the transport stream. In step 624, the RF switch 216 generates an output switch that is communicated to the uplink RF system. The uplink RF system generates the uplink signal based upon the output signal from the RF switch. The uplink signal is then uplinked to a satellite. In a non-satellite system, the RF signal may be communicated through a terrestrial antenna or wired-type system.

Figure 7:
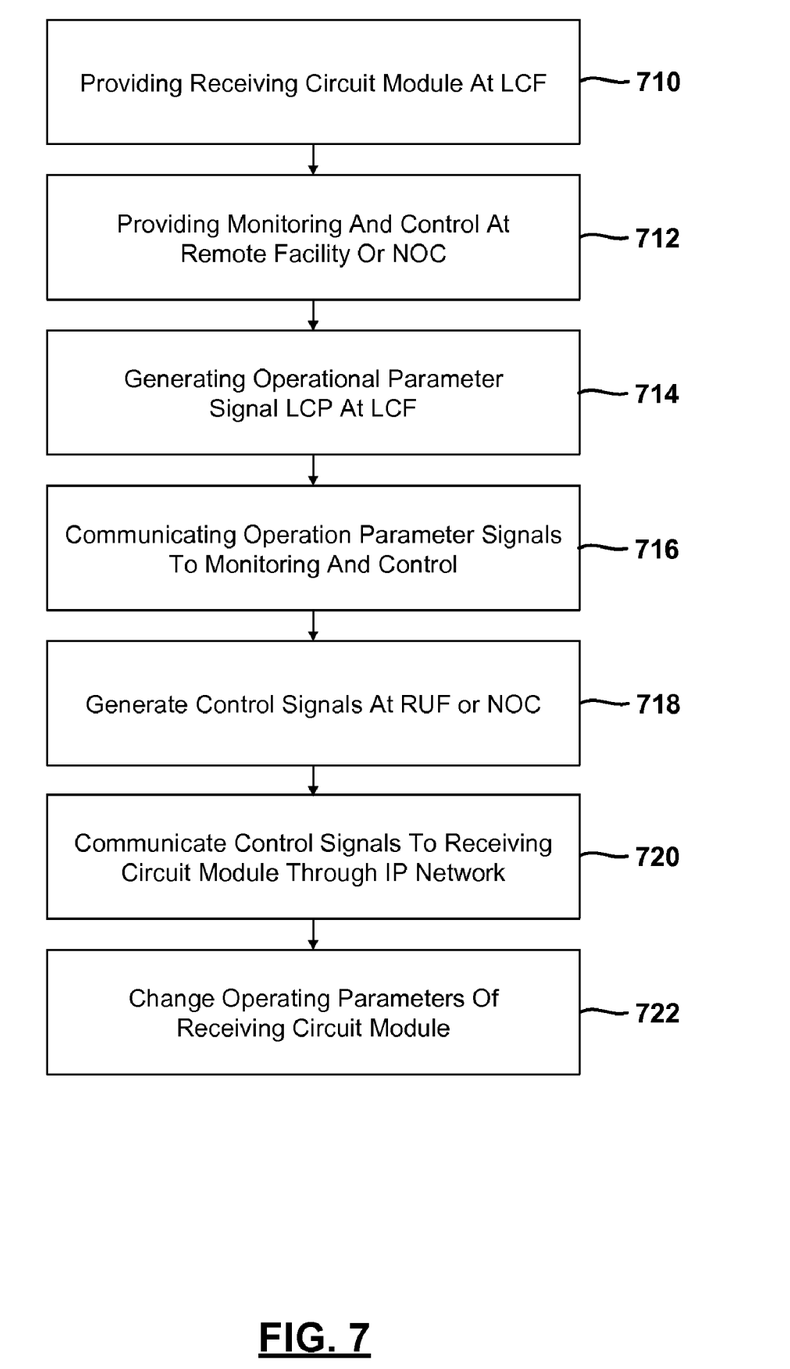
FIG. 7 is a flowchart illustrating a method for controlling the parameters at the receiving circuit module.

Referring now to FIG. 7, a method for controlling the local collection facility is set forth. As mentioned above, the local collection facility may be controlled at a remote uplink facility or network operation center. In step 710, each of the local collection facilities has a receiving circuit module for each channel desired to be operated. In addition, a monitoring receiving circuit module may also be provided. The receiving circuit module may be controlled through control signals from the remote uplink facility. The desired channel to be monitored is routed through the monitoring receiving circuit module 106. The signals to be monitored are routed through the IP network 32 to the remote uplink facility or to the network operation center. Monitoring and control may be provided through the remote facility or through the network operation center in step 712.

In step 714, operational parameters (data) may be generated at the local collection facility. The operational parameter signals may include the channel signals themselves, the status of the encoder and the status of the receiver. In step 716, the operational parameter signals are communicated to the monitor and control system. As mentioned above, the operational parameter signals may be communicated through an IP network.

In step 718, control signals are generated at the remote uplink facility or network operation center in response to the operational parameter signals. In step 720, the control signals are communicated through the IP network to the receiving circuit module. The operating parameters of the receiving circuit modules are thus changed in response to the control signal.

Examples of changing the parameters of the encoders may include adjusting the audio and video parameters, enabling or disabling closed-captioning, initiating ghost cancelling, selecting a video output format regardless of the input format, resetting the encoder and controlling or adjusting the processing amplifier such as chroma, hue, timing, pedestal, test pattern availability and the like.

Examples of the operation parameter signals may include various types of operational parameter signals such as a test pattern status such as enabled or disabled, a closed-captioning status, a primary or secondary output stream status, an audio video status, an input signal alarm, a low bit error rate or modulation error ratio (MER) signal, a carrier lock alarm, a service lock alarm, an over temperature, power supply or fan alarm, a port failure or a buffer filled alarm. Each of these signals may be used as the operational parameter signals provided to the monitoring and control system from the local collection facility.

Figure 8:
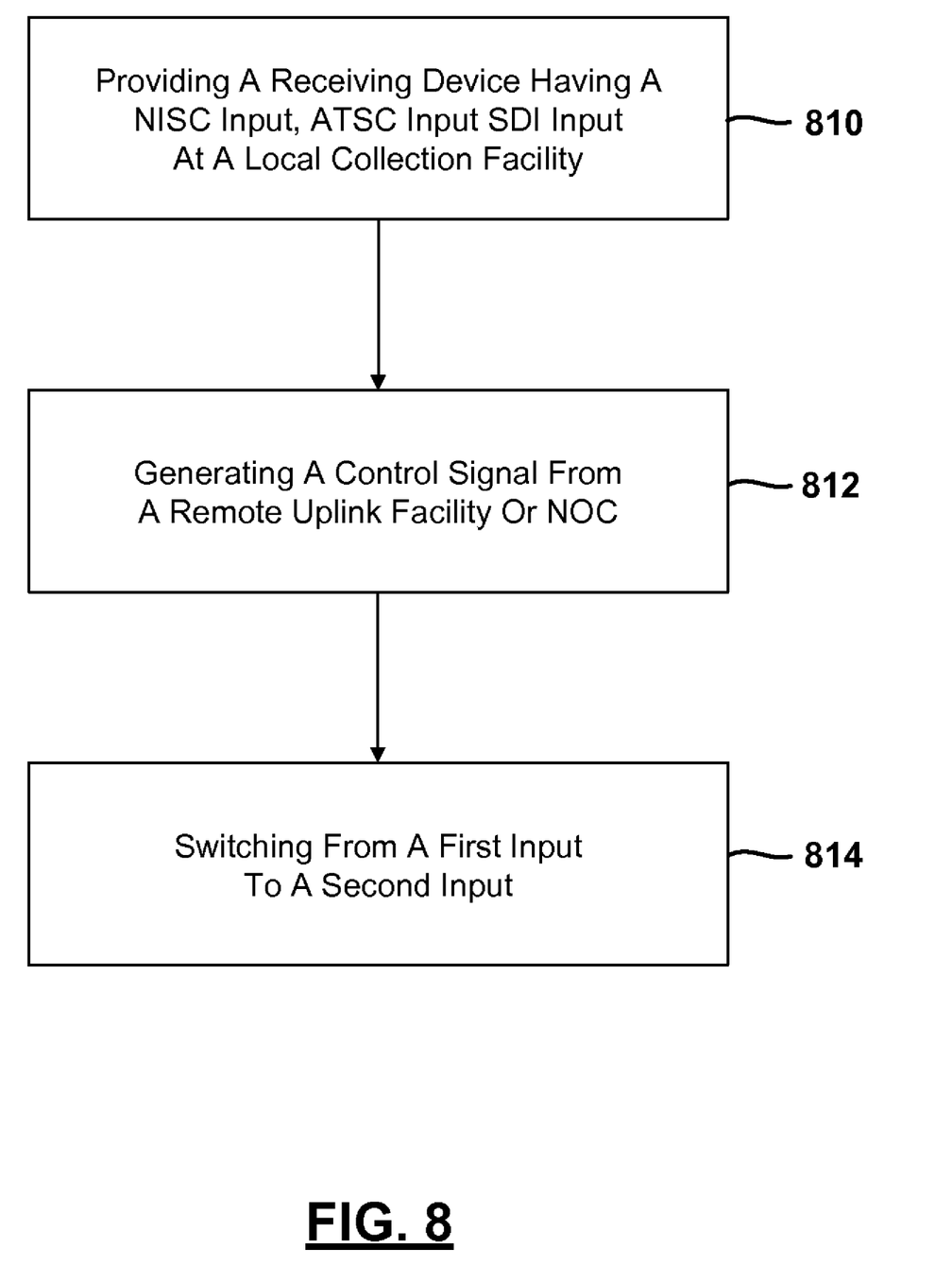
FIG. 8 is a flowchart of a method for switching the receiving source of the receiving circuit module.

Referring now to FIG. 8, the receiving circuit module may also be remotely controlled to switch between various types of inputs. In step 810, the receiving device is provided with an NTSC input and an ATSC input through the RF input and an SDI input. In step 812, a control signal from the remote uplink facility or network operation center is generated. The control signal is communicated through the network to the local collection facility in step 812.

In step 814, the system is controlled to switch from a first input to a second input. That is, the RF input circuit may be switched to provide input signals from an NTSC source or an ATSC source. The system may also be changed to not use either of the NTSC or ATSC inputs but rather use the serial digital interface. The switching from one input to another input may be controlled from the remote uplink facility or network operation center. Because several local collection facilities may be coupled to a single remote uplink facility, this allows greater flexibility for the system. When a particular television station changes from standard definition format to a high definition format, the change may be easily accommodated at the local collection facility through control at the remote uplink facility.

Figure 9:
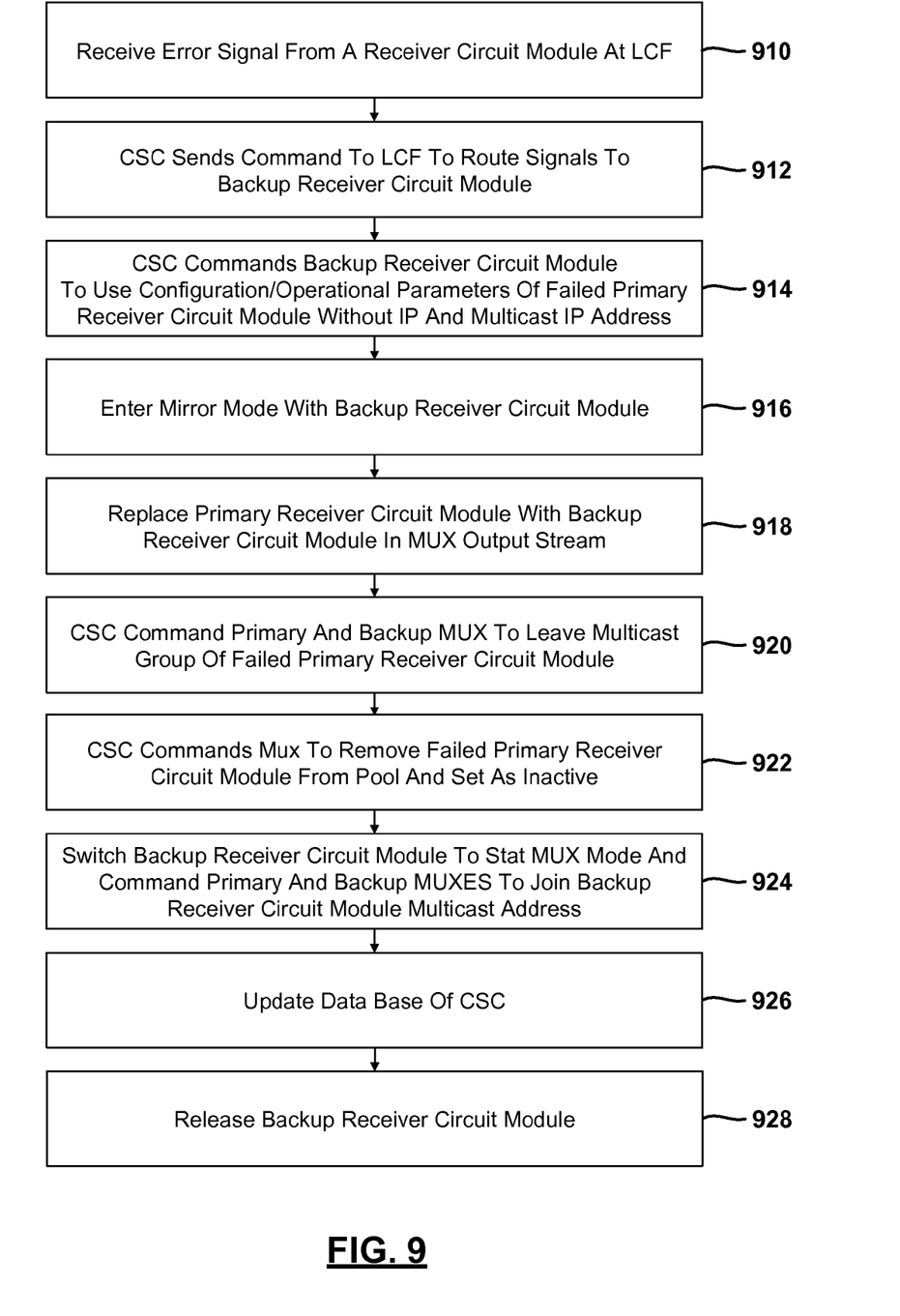
FIG. 9 is of a method for switching to a back-up receiver circuit module.

Referring now to FIG. 9, the local collection facilities may also include a back-up receiving circuit module. Several back-up receiving circuit modules may be included in a local collection facility. Preferably, one back-up receiving circuit module 108 is included for N number of receiving circuit modules. In one example, for receiving circuit modules correspond to one back-up receiving circuit module. The back-up receiving circuit module may be referred to as a "pooled" back-up receiving module. Of course, the present invention applies to the conditions where a receiving circuit module are composed of several circuits such as an individual encoder.

In step 910, an error signal may be received from a receiver circuit module at the local collection facility. The error signal may be one of the signals described above with respect to the operation of the encoder. The signals may be transmitted and an error determined at a monitoring facility. In step 912, the compression system controller sends a command to the local collection facility to route signals to the back-up receiver circuit module.

In step 914, the compression system controller commands the back-up receiver circuit module to use the configuration and operational parameters of the failed primary receiver circuit module without IP and multicast addresses. In this case, the receiver may be tuned and decoded according to the parameters of the primary channel. In step 916, a mirror mode may be entered with the back-up receiver circuit module. The monitoring system may be used to monitor the channel signal through the back-up receiving circuit module prior to placing the back-up receiving circuit module on air. In step 918, the primary encoder is replaced with the back-up encoder in the multiplexing output stream. In step 920, the compression system controller commands the primary and back-up multiplexer to leave the multicast group of the failed primary receiving circuit module. The compression system controller then commands the multiplexer to remove the failed primary receiver circuit module from the pool and set it as an inactive in step 922. In step 924, a back-up receiver circuit module is switched to the statistical multiplexer and the primary and back-up multiplexers at the remote uplink facility are commanded to join the back-up receiver circuit module through the multicast address. Thus, the multiplexer is then able to receive the properly addressed signals from the back-up receiving circuit module. In step 926, the database of the compression system controller is updated to indicate that the back-up receiving circuit module has been placed on air.

Should the primary receiving circuit module become repaired or no longer has a problem, the back-up receiver circuit module may be released using steps 910 through 926.

As can be seen above, the manual switchover may be a look-before-leap-type system so that the accuracy and configuration of the back-up encoder may be verified before switching to it in an on-line or on-air fashion. It should be noted that the process may be a manual switchover or the process may provide automatic switchover based upon various signals received back from the local collection facility.

Figure 10:
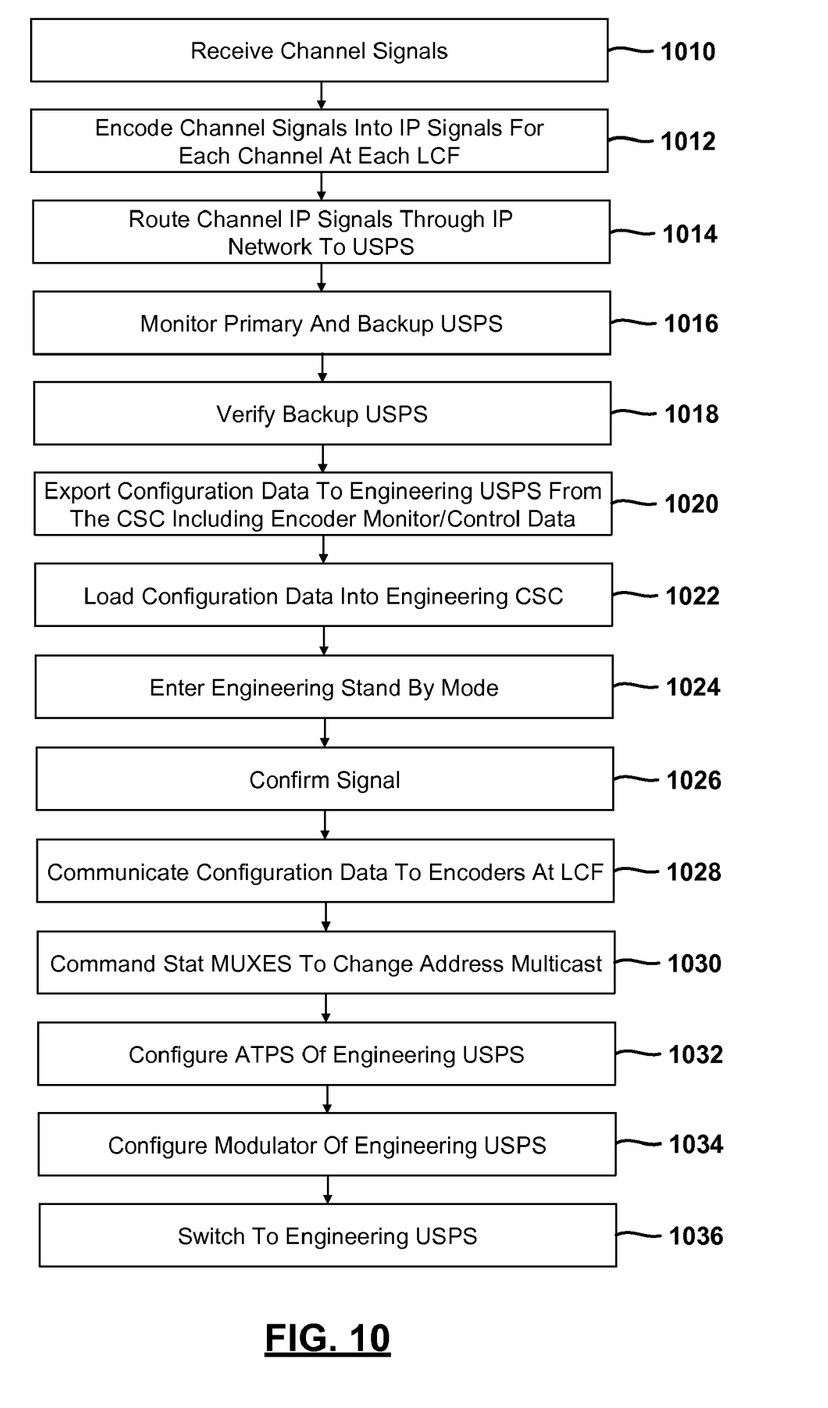
FIG. 10 is a flowchart of a method for switching to an engineering uplink signal processing system.

Referring now to FIG. 10, the remote uplink facility may also include a secondary or back-up remote uplink facility. This will be referred to as the engineering USPS. Several remote or local collection facilities may share the same engineering USPS. The output of a USPS corresponds to the signals for one transponder on one satellite for the case of the satellite system. In the case of a non-satellite system, the word "uplink" may be not be used to end the description.

Various channels are received at the local collection facility. In step 1012, the channel signals are received and encoded into IP signals by a respective receiving circuit module at each LCF. In step 1014, the channel's IP signals are routed through the IP network to the remote uplink facility. In step 1016, the primary and back-up USPS's are monitored. In step 1018, the USPS back-up is verified.

In step 1020, configuration data is exported to the engineering USPS from the compression system controller including the encoder, monitor and control data. In step 1022, the configuration data is loaded into the engineering compression system controller. In step 1024, an engineering standby mode is entered. The compression system controller may propagate configuration data from the internal database to both the statistical multiplexers to start receiving the IP packets multicast from the local collection facilities and perform a multiplexing operation. Since both the statistical multiplexers of the engineering USPS are in standby mode, they do not send out allocation messages and they share the same complexity messages sent by the encoders on the same multicast address as the production USPS. In step 1026, once the engineering USPS signal is confirmed, the engineering compression system controller communicates the configuration data from its internal database to all the encoders at the local collection facilities in step 1028. The statistical multiplexers are commanded to change the multicast address in step 1030. The ATPS of the engineering multiplexer is thus configured. Also, the modulator of the engineering USPS is configured. In step 1036, the change to the engineering USPS is completed and the engineering USPS is on-air while the primary USPS at the remote uplink facility is disabled.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
    at a first local collection facility comprising a first plurality of receiving circuit modules,
        receiving a first plurality of channel signals at the first plurality of receiving circuit modules;
        generating a first plurality of IP encoded signals from the first plurality of channel signals; and
        at a first router, routing the first plurality of encoded signals to an IP network;
    at a second local collection facility comprising a second plurality of receiving circuit modules, receiving a second plurality of channel signals at the second plurality of receiving modules;

generating a second plurality of IP encoded signals from the second plurality of channel signals; and at a second router, routing the second plurality of encoded signals to the IP network;

at a remote facility located remotely from the first local collection facility and the second local collection facility, and controlling the first plurality of receiving circuit modules and the second plurality of receiving circuit module with a compression system controller, configuring an output signal of a statistical multiplexer with the compression system controller so that at least one of the first plurality of receiving circuit modules and at least one of the second plurality of receiving circuit modules form a multicast group wherein at least one of the first plurality of encoded signals and at least one of the second plurality of encoded signals are multiplexed together with the statistical multiplexer to form the output signal.

2. A method as recited in claim 1 further comprising monitoring the first plurality of receiving circuit modules and the second plurality of receiving circuit modules with the compression system controller.

3. A method as recited in claim 2 further comprising configuring an encoder at the first local collection facility in response to monitoring.

4. A method as recited in claim 1 further comprising monitoring the statistical multiplexer with the compression system controller.

5. A method as recited in claim 1 further comprising controlling the statistical multiplexer to form an uplink signal for a transponder of a satellite with the compression system controller.

6. A method as recited in claim 1 further comprising generating a multiplexed IP signal and an asynchronous serial interface signal at the statistical multiplexer.

7. A method as recited in claim 1 further comprising communicating the multiplexed IP signal to the compression system controller from the statistical multiplexer.

8. A method as recited in claim 1 wherein receiving the first plurality of channels comprises receiving standard definition terrestrial over-the air channel signals received through an antenna.

9. A method as recited in claim 1 wherein receiving the first plurality of channels comprises receiving high definition terrestrial over-the air channel signals received through an antenna.

10. A method as recited in claim 1 wherein receiving the first plurality of channels comprises receiving local channel signal received through wired or optical connection.

11. A system comprising:
an IP network;
a first local collection facility comprising a first plurality of receiving circuit modules receiving a first plurality of channel signals and generating a first plurality of IP encoded signals from the first plurality of channel signals and a first router routing the first plurality of encoded signals to the IP network;

a second local collection facility comprising a second plurality of receiving circuit modules receiving a second plurality of channel signals and generating a second plurality of IP encoded signals from the second plurality of channel signals and a second router routing the second plurality of encoded signals to the IP network; and a remote facility having a statistical multiplexer in communication with the IP network, said remote facility comprising a compression system controller controlling the first plurality of receiving circuit modules and the second plurality of receiving circuit modules and configuring the statistical multiplexer and at least one of the first plurality of receiving circuit modules and at least one of the second plurality of receiving circuit modules to form a multicast group so that at least one of the first plurality of encoded signals and at least one of the second plurality of encoded signals are multiplexed together with the statistical multiplexer to form an output signal.

12. A system as recited in claim 11 wherein the compression system controller comprises a primary compression system controller and a secondary compression system controller.

13. A system as recited in claim 11 wherein the compression system controller monitors the first plurality of receiving circuit modules and the second plurality of receiving circuit modules.

14. A system as recited in claim 11 wherein the compression system controller configures an encoder at the first local collection facility.

15. A system as recited in claim 11 wherein the compression system controller monitors the statistical multiplexer.

16. A system as recited in claim 11 wherein the compression system controller controls the statistical multiplexer to form an uplink signal for a transponder of a satellite.

17. A system as recited in claim 11 wherein the statistical multiplexer generates a multiplexed IP signal and an asynchronous serial interface signal.

18. A system as recited in claim 11 wherein the statistical multiplexer communicates the multiplexed IP signal the compression system controller.

19. A system as recited in claim 11 wherein the first router comprises a primary router and a secondary router.

20. A system as recited in claim 11 wherein the first plurality of channel signals comprises standard definition terrestrial over-the air channel signals received through an antenna.

21. A system as recited in claim 11 wherein the first plurality of channel signals comprises high definition terrestrial over-the air channel signals received through an antenna.

22. A system as recited in claim 11 wherein the first plurality of channel signals comprises local channel signals received through wired or optical connection.

23. A system as recited in claim 11 wherein the first local collection facility is located in a first designated marketing area and the second local collection facility is located in a second designated marketing area spaced apart from the first designated marketing area.

* * * * *